United States Patent [19]
Jones

[11] Patent Number: 5,252,298
[45] Date of Patent: Oct. 12, 1993

[54] DEVICE FOR CLEANING GASES

[75] Inventor: Dale G. Jones, Visalia, Calif.

[73] Assignee: Noell, Inc., Herndon, Va.

[21] Appl. No.: 872,621

[22] Filed: Apr. 22, 1992

Related U.S. Application Data

[62] Division of Ser. No. 678,267, Apr. 23, 1991, abandoned.

[51] Int. Cl.$^5$ ............ B01D 50/00; B05B 7/06; C01B 21/00
[52] U.S. Cl. .................... 422/172; 422/182; 422/169; 239/427; 239/430; 239/434; 239/391; 423/235
[58] Field of Search ............... 422/168-170, 422/171, 172, 182, 183; 239/390, 391, 427, 429, 430, 431, 432, 434, 587; 423/235, 237, 238, 239

[56] References Cited

U.S. PATENT DOCUMENTS

| | | | |
|---|---|---|---|
| 1,427,910 | 9/1922 | Quinn | 239/427 |
| 1,535,702 | 2/1924 | Walsh et al. | 239/427 |
| 1,653,297 | 1/1927 | Labelle | 239/427 |
| 2,052,747 | 5/1935 | Bishop | 299/140 |
| 3,224,793 | 12/1965 | Benjamin | 239/427 |
| 3,628,737 | 3/1971 | Norton | 239/434 |
| 3,650,476 | 3/1972 | Rackley et al. | 239/431 |
| 3,893,810 | 7/1975 | Lientz | 423/277 |
| 3,900,554 | 8/1975 | Lyon | 423/235 |
| 4,208,386 | 6/1980 | Arand et al. | 423/235 |
| 4,421,798 | 12/1983 | Lin | 427/421 |
| 4,819,878 | 4/1989 | Bailey | 239/427 |
| 4,905,900 | 3/1990 | Scharton et al. | 239/99 |

FOREIGN PATENT DOCUMENTS

| | | |
|---|---|---|
| 3335543 | 9/1983 | Fed. Rep. of Germany . |
| 2373327 | 9/1977 | France . |
| WO89/07004 | 8/1989 | World Int. Prop. O. . |

OTHER PUBLICATIONS

Paper titled "Control of Nitrogen Oxides Emissions from Stationary Sources," by Epperly et al, dated Mar. 1988.
Publication titled "Improved ER&E Thermal DeNOx Process," provided by Exxon Research and Engineering Company, dated Oct. 1985.
Brochure titled "NOxOUT," provided by Fuel Tech Corporation, dated Sep. 1988.

Primary Examiner—Robert J. Warden
Assistant Examiner—Christopher Y. Kim
Attorney, Agent, or Firm—Christie, Parker & Hale

[57] ABSTRACT

Techniques and associated systems are provided for removing oxides of nitrogen (NO and $NO_2$, hereinafter called $NO_x$) from combustion effluent gases. Such a system includes a nozzle and means for introducing a carrier gas and an injection chemical into the nozzle to be mixed together. The mixture is ejected from the nozzle into a flue gas duct to provide a high degree of cross-sectional coverage and intimate mixing between the injection chemical and the $NO_x$-containing combustion effluent gas.

24 Claims, 5 Drawing Sheets

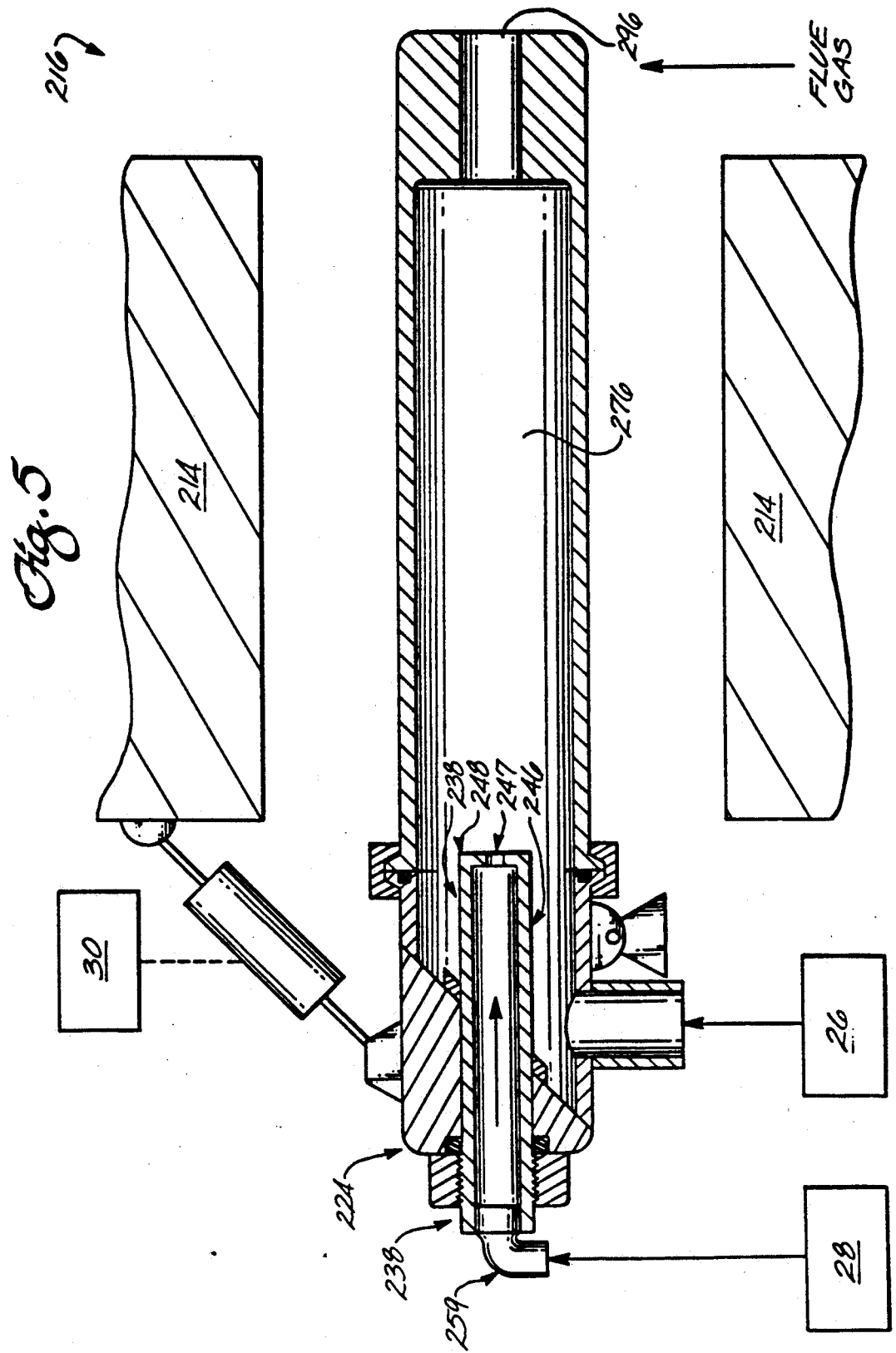

DEVICE FOR CLEANING GASES

This is a division, of U.S. application Ser. No. 07/678,267 filed Apr. 23, 1991, now abandoned.

FIELD OF THE INVENTION

This invention relates to techniques and associated systems useful for removing oxides of nitrogen (NO and $NO_2$, hereinafter called NOx) from combustion effluent gases. More particularly, this invention relates to techniques and systems used for mixing fluids together and for injecting the mixture into a combustion effluent gas stream flowing through a high-temperature duct having a large cross-sectional area. Such a system includes a unique nozzle and means for introducing a carrier gas and an injection chemical into the nozzle to be mixed together. The mixture is ejected from the nozzle into the duct to provide a high degree of cross-sectional coverage and intimate mixing between the injection chemical and the NOx-containing combustion effluent gases, resulting in removal of oxides of nitrogen prior to discharge of the flue gas into the atmosphere. For some applications, the invention can also be used to control the temperature of the fluid gas which will also usually provide some reduction of NOx through the well-known "reburning" process.

RELATED APPLICATION

This patent application relates to a patent application filled via the Patent Cooperation Treaty on Feb. 2, 1988, which was assigned International Application No. PCT/US88/00463, entitled "Process and Apparatus Using Two-Stage Boiler Injection for Reduction of Oxides of Nitrogen." International Application No. PCT/US88/00463 is incorporated herein by this reference

BACKGROUND OF THE INVENTION

Coal-fired utility boilers and other combustion systems, such as municipal solid waste incinerators, produce emissions which contain oxides of nitrogen (NOx) and oxides of sulfur ($SO_2$), both of which have been found to cause acid rain. Studies have demonstrated that the NOx-related portion of acid rain can produce extensive damage to trees and forests. Thus, it is important to reduce NOx emissions from such combustion systems to the extent possible. While it is desirable to provide for reduction of NOx emissions from combustion systems, there is currently no demonstrated non-catalytic technology capable of removing in excess of 60% to 70% of the NOx.

One presently known catalytic system for removing NOx, called the selective catalytic reduction (SCR) system, provides for injection of ammonia gas into a NOx-containing flue gas to thereby react the ammonia with NOx over a catalyst at temperatures of about 700° F. to produce nitrogen gas and water vapor as by-products. Typical NOx reduction levels are 80%, using the SCR system, with the reported cost varying between about $60/kw to $120/kw, depending on site conditions. The operating cost of SCR technology is high, due in part to the high cost of catalyst replacement which is required about once every two years. SCR technology is not considered applicable to incinerators due to the contamination and poisoning of the catalyst.

Another presently known NOx control system, called the selective non-catalytic reduction (SNCR) system, provides for injection of gaseous ammonia or liquid phase urea into a flue gas at temperatures above 1400° F. to reduce NO to nitrogen. The SNCR systems suffer the disadvantage that, if sufficient ammonia or urea is injected to achieve high NOx removal efficiency, there may be an unacceptably high degree of ammonia slippage. (As used herein, "ammonia slippage" or "ammonia slip" means to concentration of ammonia gas contained in the flue gas exit from the NOx control process.) The ammonia slip combines with $SO_2$, $SO_3$, HCl and HF to form ammonia salts at temperatures typically less than 500° F. When such salts condense, solid particulate is formed, which may cause deposits in critical zones, such as the air preheater systems in conventional boilers. In order to prevent this problem, less ammonia or urea is injected, and the overall NOx reduction capability of SNCR systems is generally limited to between 30% and 60%. This level of performance is unacceptably low.

In order to overcome the problems associated with the SCR and SNCR systems, I conceived and developed several alternative NOx reduction processes and the systems useful for carrying them out. A first such process is set forth in U.S. Pat. No. 4,783,325 issued Nov. 8, 1988 entitled "Process and Apparatus for Removing Oxides of Nitrogen and Sulfur from Combustion Gases." U.S. Pat. No. 4,783,325 is incorporated herein by this reference. The process disclosed in my '393 application preferably operates between 800° F. and 1400° F., and utilizes a peroxyl initiator (an injection chemical), such as methanol, dispersed or mixed in a carrier gas which is injected into a flue gas to contact and convert NO contained in the Flue gas to $NO_2$. $NO_2$ is then removed from the flue gas prior to its discharge into the atmosphere by means of a dry particulate absorbent and/or by wet scrubbing, or the like. (A "peroxyl initiator," as used herein, is a material which reacts with oxygen ($O_2$) to form the peroxyl ($HO_2$) radical. Such materials include hydrocarbons, such as propane, methane, and the like, oxygen substituted hydrocarbons, such as methanol and ethanol, as well as hydrogen, and hydrogen peroxide.)

A second such alternative process that I conceived and developed is set forth in a patent application that I filed via the Patent Cooperation Treaty on Feb. 2, 1988, assigned International Application No. PCT/US88/00463, and titled "Process and Apparatus Using Two-Stage Boiler Injection for Reduction of Oxides of Nitrogen." The U.S. Pat. No. 4,783,325, which is incorporated herein, discloses a process where an NHi precursor material (an injection chemical) is mixed in a carrier gas and injected into a flue gas stream at a temperature greater than 1400° F. in a first injection zone to reduce NO to nitrogen, followed by mixing a peroxyl initiator in a carrier gas and injecting this second mixture into the flue gas in a second injection zone downstream from the first injection zone at a temperature less than 1400° F. to oxidize residual NO to $NO_2$. The $NO_2$ may then be removed from the flue gas by conventional means prior to its discharge into the atmosphere. ("NHi precursors," as used herein, are materials, such as ammonia, urea, cyanuric acid, biurst, triuret, ammelide, or mixtures thereof, which react to form NHi radicals, i.e., short-lived molecules comprising one nitrogen atom and one or more hydrogen atoms, such as NH, $NH_2$ and $NH_3$.)

I discovered, however, that, because the chemical reactions between the injection chemicals and the NOx molecules in the flue gas take place so rapidly at elevated temperature, the presently available injection systems, including available mixing nozzles, do not provide for the desired amount of cross-sectional coverage and mixing of the injection chemical in large flue gas ducts in a short enough time to provide for desirably higher levels of NOx removal. For example, presently available nozzle systems have the object of providing highly atomized liquid droplets while using a minimum amount of atomizing media, such as compressed air. Such a highly atomized cloud of droplets is difficult to inject with sufficient velocity to penetrate across a large flue gas duct. It is also important that such penetration be made as rapidly as possible so that the injection chemicals contact and react with the maximum amount of flue gas to thereby convert NO to $N_2$ (as is the case with the NHi precursor), or to convert NO to $NO_2$, as in the case with the peroxyl initiator.

Thus, techniques and associated systems are needed that will provide for, first, adequately dispersing injection chemicals in a carrier gas and, second, for injection the resulting mixture at a sufficiently high velocity into the flue gas for maximizing rapid contact between the injection chemicals and the NOx molecules in the flue gas.

There is also a need for techniques and associated systems that are effective for controlling the temperature of flue gas. For example, if an excess of peroxyl initiator material is injected, the resulting exothermic reactions can increase flue gas temperature. This technique is described as the "reburning" or "two-stage combustion" process for reducing NO to nitrogen. However, in the context of the present invention, means are provided for injecting the second stage fuel, i.e., the peroxyl initiator, at high velocity and in a unique manner, so that the flue gas temperature can be controlled. If, in an incineration system, for example, it is desired to control the temperature of the flue gas at 1800° F., i.e., greater than 1400° F., then the peroxyl radical will not be formed in large quantities, and NO will be preferentially reduced to $N_2$ by the "reburning" process since the peroxyl initiators defined above would all be considered "clean" fuels containing low levels of fuel nitrogen content.

SUMMARY OF THE INVENTION

This invention relates to methods and systems useful for removing oxides of nitrogen (NOx) from a combustion effluent flue gas stream. Such methods comprise the steps of mixing together a carrier gas and an injection chemical selected from the group consisting of an NHi precursor material, a peroxyl initiator material, and mixtures thereof, in a nozzle, to thereby provide an injection mixture. The injection mixture is introduced from the nozzle into the flue gas stream, while the ratio of the pressure in the injection mixture upstream from the nozzle orifice to the pressure in the flue gas in the vicinity of the nozzle is preferably greater than about 1.28, so that the velocity of the injection mixture is at least 0.6 times the speed of sound in the mixture (Mach No. 0.6). In another preferred embodiment, the injection mixture is introduced into the flue gas stream at approximately the velocity of sound in the mixture (Mach No. 1.0), using air as the carrier gas.

In one embodiment, the systems useful for carrying out the methods of the invention include an elongated nozzle for mixing fluids together and for injecting the mixture through the walls of a gas duct and into the combustion effluent flue gas stream. The nozzle includes a body section and a mixing section, with the body section configured to be located outside the gas duct wall and having a chamber closed at one end and open at its other end for discharge of fluids. An inlet extends into the chamber for entry of a first fluid, and an injector assembly, comprising an injector tube, extends into the chamber for entry of a second fluid. The discharge end of the injector tube is positioned downstream from the first fluid inlet. The mixing section comprises a chamber configured to extend through the gas duct wall, having an outlet end configured to extend into the gas stream and an inlet end configured to extend outside the gas duct wall. Means are provided for removably coupling the discharge end of the body section to the inlet end of the mixing section.

BRIEF DESCRIPTION OF THE DRAWINGS

These and other features, aspects, and advantages of the present invention will be more fully understood when considered with respect to the following detailed description, appended claims, and accompanying drawings, wherein:

FIG. 2a is a fragmentary cross-sectional side view of a nozzle assembly similar to the nozzle assembly of FIG. 2 but having a gas flow orifice capable of providing supersonic velocity to the fluid passing through the orifice;

FIG. 5 is a semi-schematic side view, in partial cross-section, of yet another preferred embodiment of a nozzle assembly provided in accordance with practice of this invention.

DETAILED DESCRIPTION

Figure 1:
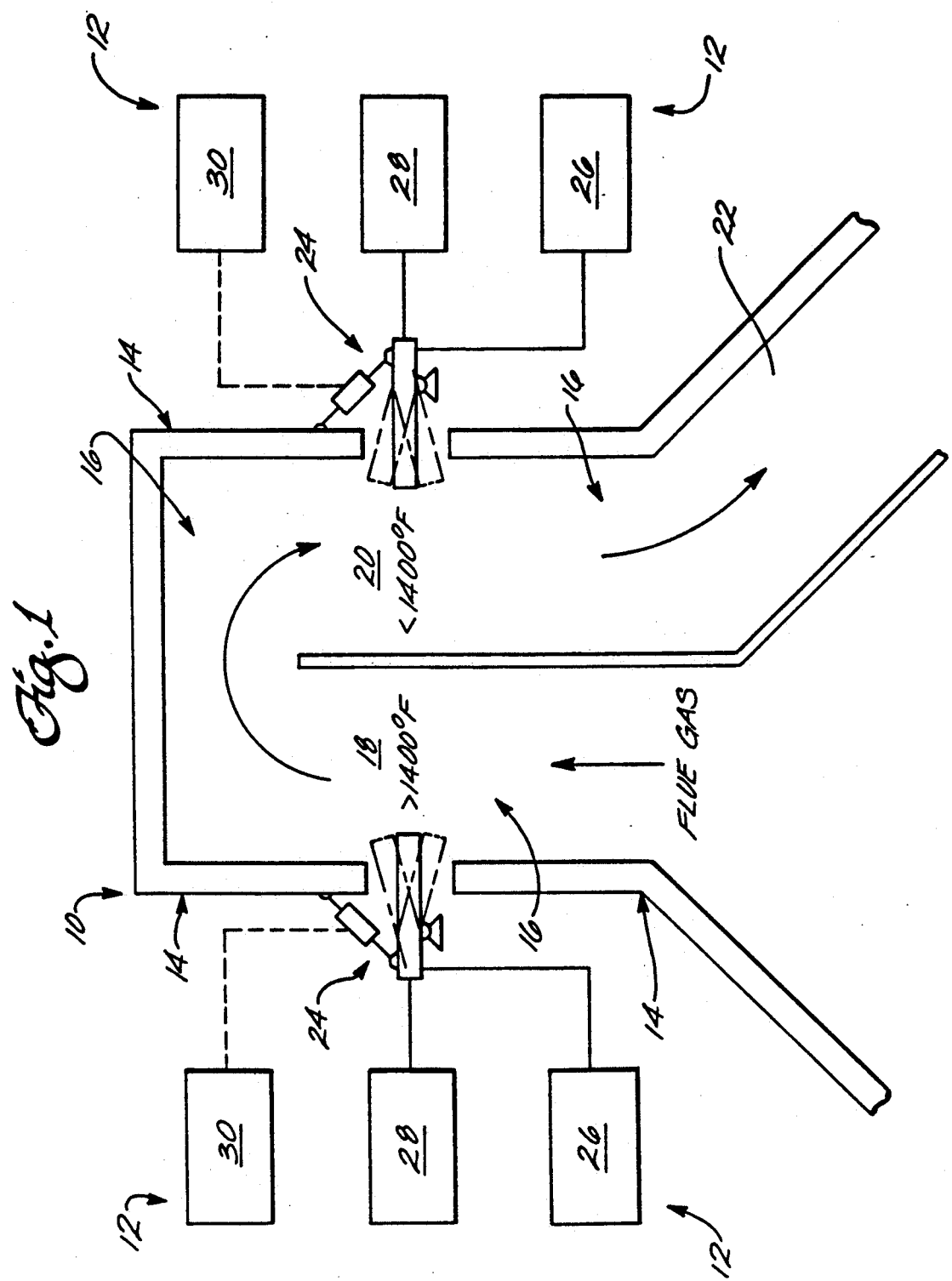
FIG. 1 is a schematic view of a boiler assembly which includes one or more associated injection systems provided in accordance with practice of this invention for mixing fluids together and for injecting the fluid mixture through the walls of a combustion effluent gas duct.

Referring to FIG. 1, there is shown a schematic view of a boiler assembly 10, which includes one or more associated injection systems 12 provided in accordance with practice of this invention. The injection systems are provided for mixing fluids together and for injecting the fluid mixture through the walls 14 of a combustion effluent gas duct 16 into a flue gas flowing through the gas duct to reduce the amount of NOx in the flue gas.

In one exemplary embodiment, the system 12 is useful for a two-stage NOx reduction process, such as the process disclosed in my patent application No. PCT/US88/00463, which is incorporated hereinabove by reference. In the first stage of the process, a first injection chemical is mixed with a carrier gas, such as air, in one such system 12, and injected into the flue gas in a first injection zone 18 where the temperature of the flue gas is greater than about 1400° F. In the first stage, the injection chemical is an NHi precursor, such as an aqueous solution of urea, which react with the flue gas to reduce NO to $N_2$. In the second stage of the process, a second injection chemical is mixed with a carrier gas, such as air, in a second such system 12, and injected into the flue gas in a second injection zone 20 where the temperature of the flue gas is less than about 1400° F. In the second stage, the injection chemical is a peroxyl initiator material, such as methanol, which reacts with the flue gas to convert NO to $NO_2$. The treated flue gas passes from the second injection zone 30 through an outlet duct 22 and through equipment, such as a wet scrubber (not shown), which removes $NO_2$ from the flue gas before it is discharged to the atmosphere.

Although the injection systems 12 are described with regard to their use with the "two-stage" process set forth in detail in my above-referenced patent application, such systems can be used to advantage in any process where two or more fluids are mixed together for injection at a high velocity into a cross-flowing gas stream to thereby maximize rapid contact between the components of the injection mixture and the gas stream. For example, when solid waste is burned in smaller shop-fabricated incineration systems, the burning technique usually incorporates a primary zone where the waste is burned. This primary zone may operate under sub-stoichiometric air/fuel conditions, and the combustion process is then completed in a secondary zone where additional air is injected. The secondary zone temperature is usually controlled at or above 1800° F. with a gas residence time of 1.0 or 2.0 seconds to assure completion of combustion. Using an injection system of this invention, it would be possible to provide means for controlling the secondary zone temperature.

In one preferred embodiment, an injection nozzle system is located between the primary and secondary zones of such a shop-fabricated solid waste incinerator. The nozzle system injects air as the carrier fluid and a peroxyl initiator, such as methane (or natural gas), as the injection chemical in sufficient amounts to raise the secondary zone gas temperature to 1800° F. in the event that it was not sufficiently high. Introduction of a "clean" fuel, such as a peroxyl initiator, like methane (or natural gas), generally causes a reduction in NOx by the "reburning" or "two-stage" combustion process. The utilization of the injection nozzle system 12 of this invention, however, provides the additional advantages of thoroughly mixing the combustion effluent gases passing between the primary and secondary zones to maximize both completion of combustion and NOx reduction effects. Other advantages include the possibility of recovering useful energy from the walls of the secondary zone by radiant heat transfer, which has not yet been tried in commercial incineration systems, since the combustion effluent gases passing from the primary to the secondary zones are not thoroughly mixed, and there exists the potential for corrosion (due to high levels of CO and HCl in the gases), as well as high levels of unburned hydrocarbon materials.

In another preferred embodiment, ordinary water is injected by means of the nozzle systems 12 of this invention to provide for cooling flue gas which is too hot. Therefore, by utilizing injection systems 12 of this invention, the flue gas can be heated or cooled to provide temperature control, using either water or peroxyl initiator materials, in one or more levels of injection containing one or more injection nozzles at each level.

In one embodiment of practice of this invention, it is desired to control and maintain the flue gas at a temperature of about 1800° F. for a period of between 1.0 and 2.0 seconds. In such a case, very high levels of NOx removal could be achieved beyond the NOx removal realized in the "reburning" process by injecting an NHi precursor material. In a preferred embodiment, this could be done by injecting the NHi precursor material by means of one or more of the nozzle systems 12 of this invention.

Returning to FIG. 1, each injection system 12 provided in accordance with practice of this invention includes one or more injection nozzle assemblies 24 which extend through the wall 14 of the gas duct 16, a gas supply system 26 to supply a carrier gas to the nozzle assembly, an injection chemical feed system 28 to introduce an injection chemical to the nozzle assembly, and a control system 30 for aiming the nozzle so that the injection chemical/carrier gas mixture enters the flue gas at a desired location.

Figure 2:
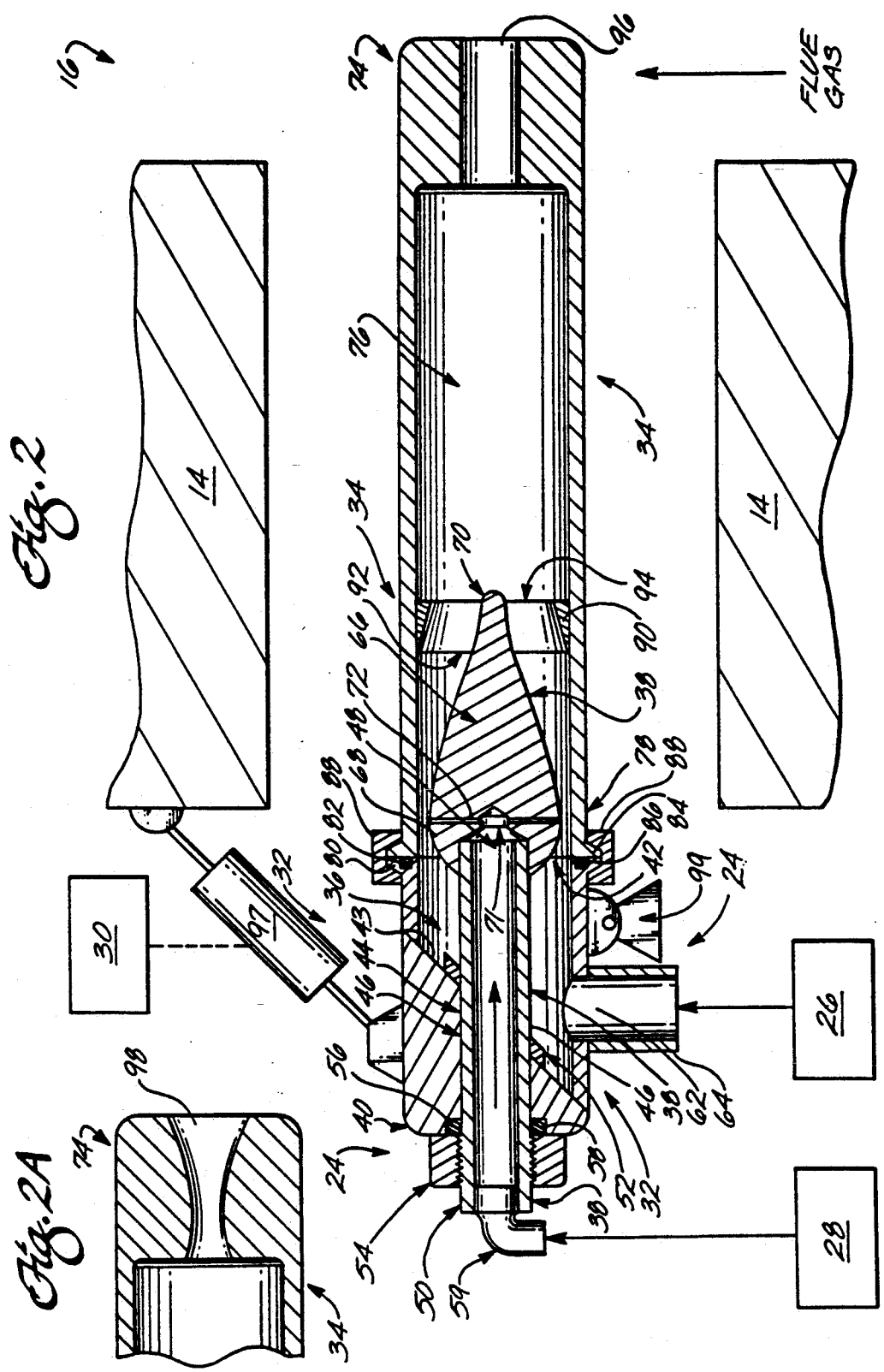
FIG. 2 is a schematic side view, in partial cross-section, of a preferred embodiment of a nozzle assembly provided in accordance with practice of this invention extending through the wall of a gas duct, and an associated carrier gas system, injection feed system, and movement control system.

Turning to FIG. 2, there is shown a semi-schematic side view, in partial cross-section, of one preferred embodiment of a nozzle assembly 24 provided in accordance with practice of the present invention, extending through the wall 14 of the gas duct 16. Included with the nozzle assembly in FIG. 2 are schematic representations of the gas supply system 26, the injection chemical feed system 28, and the control system 30.

The nozzle assembly 24 includes a body section 32 configured to be located outside the gas duct wall 14 and a mixing section 34 which extends through the duct wall and into the flue gas stream. The body section 32 includes a hollow cylindrical chamber 36 and an injector assembly 38, which extends into and, in the illustrated embodiment, through the hollow chamber 36. The chamber 36 is closed at one end, i.e., its upstream end, 40 and open at its other end, i.e., its downstream end, 42 of discharge of fluids into the mixing section 34. In the illustrated embodiment, the closed end 40 is formed from a solid cylindrical rod which is cut at about 45° angle to provide a surface 43 facing the downstream end 42. A cylindrical bore 44 is through the center of the rod along its length and parallel to the longitudinal axis of the nozzle assembly. A pipe cut at a 45° angle and joined around the perimeter of the angled surface 43 forms the hollow chamber 36 of the body section 32.

The injector assembly 38, provided in accordance with a preferred embodiment of this invention, comprises a cylindrical injector tube 46 mounted in the bore 44, with a downstream or outlet end 48 of the tube 46 extending into the hollow chamber 36 and its upstream or inlet end 50 outside the bore 44. A stop ring 52 is welded onto the injector tube 46 around its circumference to provide a 45° angled surface for mating against the front-facing angled surface 43. The injector tube inlet end 50 is threaded externally to mate with the threads of a nut 54 which secures the injector tube in the bore 44. An annular groove 56 is around the opening of the bore 44 in the body section surface facing away from the hollow chamber 36. An O-ring 58 is in the groove 56 and is held in gas-sealing engagement by the nut 54 when the nut is tightened onto the end of the injector tube.

A fitting 59 is secured on the injector tube inlet 50 by means of threads (not shown) on the outside of the fitting, engaged to threads (not shown) on the inside surface of the tube inlet 50. The injection chemical feed system 28 supplies the injection chemical to the nozzle assembly 24 by means of a flexible tube (not shown), or the like, extending from the feed system 28 to the fitting 59.

The body section 32 also includes an inlet opening 62 through the wall of the hollow chamber 36, with a pipe fitting 64 welded to the opening 62 around its perimeter. The gas supply system 26 provides the carrier gas into the nozzle assembly by means of a flexible tube, or the like (not shown), extending from the supply system 26 to the inlet fitting 64.

In one embodiment, preferred when the injection chemical is provided as a liquid, the injector assembly includes a center body 66 mounted on the discharge or outlet end 48 of the injector tube 46. In an exemplary embodiment, the center body 66 has a teardrop shape, rounded on one end, i.e., its upstream end 68 and tapered at its opposite end, i.e., its downstream end, 70. The center body rounded end 68 is mounted on the discharge end 48 of the injector tube 46, with the longitudinal axis of the center body extending essentially along the longitudinal axis of the nozzle assembly 24. The outlet 48 of the injector tube 46 opens into a truncated cone-shaped cut-out portion 71 in the rounded end of the center body 68. One or more bores 72 extend through the center body from the cut-out portion 71 to its surface. The clearance between the center body and the walls of the mixing chamber is at its smallest value at the maximum diameter of the center body. Thus, the velocity of the carrier gas is at a maximum in this area. It is preferred, therefore, that such bores 72 exit the center body at about the location of its maximum diameter so that the injection chemical is introduced into the carrier gas at the location of its maximum velocity. This enhances mixing of the injection chemical with the carrier gas.

In one preferred embodiment, eight such bores 72 are provided, but more or fewer than eight bores can be used, if desired. The bores preferably extend in an imaginary plane, substantially perpendicular to the longitudinal axis of the center body, and radially spaced apart equally from each other around the periphery of the center body. Such equal spacing provides for uniform distribution of the injection chemical from the center body.

The nozzle assembly mixing section 34 is configured to extend through the gas duct wall 14, with its outlet or downstream end 74 extending into the flue gas stream flowing through the duct 16. The mixing section includes an open cylindrical chamber 76 having an inlet or upstream end 78 configured to extend outside the gas duct wall 14. The inlet end 78 is configured to mate in gas-sealing engagement with the open discharge end 42 of the body section 32.

In a preferred embodiment, means are provided for removably coupling the discharge end 42 of the body section 32 to the inlet end 78 of the mixing section 34. In the illustrated embodiment, the coupling means includes a flange 80 around the discharge end 42 of the body section, and a flange 84 around the inlet end 78 of the mixing section. An annular groove 82 is around the front-facing surface 34 of the flange 80. An O-ring 86 is in the groove 82 and a coupling ring 88 is mounted on the flanges around the entire perimeter of the nozzle to hold the flanges together and to provide that the O-ring 86 forms a gas-tight seal between the body section 32 and the mixing section 34. Such coupling rings can be, for example, quick-disconnect rings provided by Aero-Quip Company, of Jackson, Michigan. Providing for the coupling means to be located outside the gas duct provides for uncoupling the mixing section 34 from the body section for cleaning without having to disassemble the body section from its mounting on the boiler.

At least one dispersion ring 90 is mounted in the interior of the mixing section chamber 76. The dispersion ring 90 is provided to redirect the flow of liquid injection chemical that is not yet entrained in the carrier gas, and which is flowing along the mixing section walls, into the carrier gas stream for atomization and entrainment. The dispersion ring 90 has a first relatively larger diameter 92 at its upstream end which is approximately equal to the interior diameter of the mixing section. The dispersion ring tapers from its first diameter to a second relatively smaller diameter 94 at its downstream end. Preferably the second dispersion ring diameter 94 is between about 80% and 90% of the first dispersion ring diameter. If the second diameter is less than about 80% of the first diameter 92, the flow of carrier fluid through the mixing section chamber 76 may be restricted. The purpose of the dispersion ring is to deflect liquid injection chemical into the carrier fluid flow. Therefore, if the second diameter is greater than about 90%, than there will not be much of a deflection effect.

In an exemplary embodiment, a cylindrical jet nozzle orifice 96 extends through the outlet end 74 of the mixing section 34 aligned along the longitudinal axis of the mixing chamber. Preferably, the diameter of the orifice 96 is of a size to provide that the velocity of the mixture exiting the orifice is greater than about 0.6 times the speed of sound in the mixture. More preferably, the diameter of the orifice is of a dimension sufficient to provide that the velocity of the mixture exiting the orifice is about the speed of sound in the mixture.

If the velocity of the mixture exiting the orifice is less than about 0.6 times the speed of sound, the amount of penetration of the mixture into the cross-flowing flue gas and the speed of mixing is less than desired. For example, using air as a carrier fluid with a sonic velocity on the order of 1150 ft/sec, if the injection jet velocity is less than Mach No. 0.6, or 690 ft/sec, and with the distance to be traversed by the jet in a typical boiler of 30 feet, then the time required is estimated to exceed 200 milliseconds to traverse the 30-foot distance. This estimate takes into account the decrease in jet velocity with distance travelled. Since the reaction times for the reaction of injection chemical with NO in the flue gas can be on the order of 50 milliseconds, the degree of contact between the injection chemical and the flue gas becomes less than desired as the Mach No. of the injection jet is decreased below 0.6. This results in less contact between the injection chemicals and the NOx in the flue gas than desired, and less than desired conversion of No to $N_2$ (when the injection chemical is an NHi precursor) and NO to $NO_2$ (when the injection chemical is a peroxyl initiator).

The velocity of a fluid flowing through an orifice is a function of the upstream and downstream pressures of the fluid. The velocity of a carrier gas through a cylindrical orifice, such as the orifice 96, is at the speed of sound (Mach No. 1.0) when the ratio of the pressure just upstream from the orifice to the pressure just downstream from the orifice is greater than, or equal to, 1.89. This is the maximum velocity attainable through a cylindrical orifice. Thus, when the carrier gas is air, it need be compressed only to a pressure about 1.89 times the pressure of the flue gas in the duct 16 to provide for sonic velocity through the nozzle 96. The compressed air need be compressed only to a pressure 1.28 times the pressure of the flue gas in the duct 16 to provide for 0.6 times the sonic velocity through the nozzle 96. In both cases, however, the type of air compressor which is required will be of the positive displacement type since centrifugal fans do not provide sufficient pressure.

Turning to FIG. 2a, a converging-diverging orifice 98, which is capable of increasing the velocity of a fluid passing through it to a velocity greater than the velocity of sound, i.e., to a supersonic velocity, can be through he outlet end 74 of the mixing section 34, if desired, in place of the cylindrical orifice 96. It is thought, however, that the increased penetration provided by increasing the injection velocity to supersonic may not always justify the increased blower size and energy required to raise the carrier gas pressure sufficiently to provide for such supersonic velocity. However, when excess carrier gas at high pressure is already available, for example, when high-pressure steam is available from a boiler, an orifice such as the orifice 98 may be preferred. Therefore, if steam is to be used as a carrier fluid, then one preferred embodiment is to utilize supersonic converging-diverging jet nozzles having relatively smaller diameters, while, if air is to be used as a carrier fluid, a preferred embodiment is to utilize sonic jet nozzles, such as with the cylindrical orifice 96, having relatively larger diameters.

In the design of nozzle injection systems, such as the system 12 provided in accordance with this invention for introducing an injection fluid into a generally cross-flowing flue gas stream, it is known that one parameter useful in describing the shape of the injection fluid jet centerline is called the momentum coefficient. This dimensionless parameter is defined as follows:

$$\text{Momentum Coefficient} = J = \left(\frac{P_J}{P_O}\right)\left(\frac{V_J}{V_O}\right)^2$$

where $P_J$=the density of the injection fluid mixture.

$P_O$=the density of the gas in the gas duct.

$V_J$=the initial velocity of the injection mixture as it exits the nozzle orifice.

$V_O$=the velocity of the flue gas in the gas duct.

The centerline of a jet of injection fluid can be mathematically modelled from empirical experiments, and a number of investigators give a correlation such as:

$$Y/Do = \left(\frac{1}{J}\right)^A \left(\frac{X}{Do}\right)^B$$

where

Y/Do=the deflection of the jet centerline downstream toward the flue gas flow direction in orifice diameters.

Do=jet orifice diameter.

X/Do=the distance traversed by the jet in orifice diameters.

J=the jet momentum coefficient, as above.

A=exponent between 1.0 and 1.5, say 1.25.

B=exponent between 2.0 and 4.0, say 3.00.

For the earlier example of a boiler duct 30 feet wide, with air being used as a carrier fluid, with the velocity of the injection fluid jet being 1150 ft/sec, and with a typical flue gas density and velocity of 0.018 lbs/$ft^3$ and 20 ft/sec, respectively, the momentum coefficient would be about J=12,000. Using a jet orifice diameter of 1.5 inches, and exponents A and B equal to 1.25 and 3.00, respectively, the deflection of the jet centerline can be calculated to be 8 diameters (1.0 foot) at 100 diameters downstream (12.5 feet) and 64 diameters (8.0 feet) at 200 diameters downstream (25 feet). Therefore, the downstream deflection of the jet centerline is less than about 10 feet by the time the jet reaches the opposite wall of the duct.

When the value of J is low, the resulting injection mixture flowing from the nozzle orifice (the injection jet) is unable to penetrate very far into the gas duct, and the injection jet centerline soon bends to conform to he direction of flow of the flue gas through the duct. It is preferred that when the velocity of the injection jet exiting the orifice 96 exceeds 0.6 times the speed of sound in the injection mixture, the J value is greater than about 1,000, and more preferably greater than 2000. In one preferred embodiment of practice of this invention, the injection mixture as it exits the nozzle assembly 24 has a velocity greater than 0.6 times the speed of sound in the injection fluid mixture and a momentum coefficient of greater than about 1,000.

To provide an injection mixture jet with a velocity greater than 0.6 times the speed of sound, where the pressure of the flue gas flowing through the gas duct is at atmospheric pressure (14.7 psia), the injection mixture must be at a pressure greater than about 4.1 psig (about 113.5 inches of water column). Since most centrifugal fans are rated at only 40 inches of water column pressure, or less, and even high-pressure centrifugal fans are rated at less than 80 inches of water, a preferred embodiment of the carrier gas supply system 26 provided in accordance with this invention includes a positive displacement compressor when air is used as the carrier gas. Carrier gases useful in practice of this invention include air, steam, recirculated flue gas, or mixtures thereof.

In developing the design of the injection system 12 provided in accordance with this invention, it is desirable to consider the ratio of the dimension of the flue gas duct into which the carrier gas/injection chemical mixture is being injected to the diameter of the cylindrical orifice 96. This dimensionless parameter defines the number of orifice diameters downstream from the nozzle orifice that the injection chemical mixture must generally traverse to reach as far as the opposite wall of the gas duct.

In one preferred embodiment of the injection nozzle system 12 of this invention, the carrier gas/injection chemical mixture is injected into flue gas generated by a boiler. Boilers generally have waterwalls consisting of vertical tubes designed to contain steam-water mixtures at high pressure. If an injection system 12 of this invention is to be installed on an existing boiler, it is desirable that the number of nozzle assemblies 24 and the size of the nozzles be kept small, so as to minimize the cost and difficulty of cutting into the boiler tubes and rewelding specially shaped tube-sections to provide access openings through the boiler walls. For these reasons, it is preferred that the diameter of the cylindrical nozzle orifices of the injection nozzle assemblies 24 provided by this invention be kept smaller than 2.0% of the largest boiler dimension. In other words, a preferred embodiment requires that the ratio of the distance that the carrier gas/injection chemical mixture jet may penetrate into the crossflowing flue gas stream to the diameter of the orifice through which the mixture passes be greater than about 50, and more preferably greater than 100.

In accordance with the correlation provided above for the downstream deflection of the jet centerline, it is apparent that the degree of such deflection depends both on the jet momentum coefficient (J) and the maximum distance to be traversed, expressed as number of jet orifice diameters ($X/D_o$). Although it is difficult to generalize such parameters for every conceivable application, it is preferred that J exceeds 1000, i.e., sufficient jet velocity, and $X/D_o$ exceeds 50, i.e., sufficiently small nozzle diameter to be of practical interest. Under these conditions, the jet deflection will be about 22 orifice diameters, but could be larger if the jet orifice is made smaller for a given boiler dimensional size, in which case the jet momentum coefficient might have to be increased to compensate for the decrease in jet orifice dimension.

In order to provide a complete characterization of the injection jet system provided in accordance with this invention, a third parameter must also be considered, which is the ratio of the mass flowrate of the injection mixture injected at each jet to the flue gas mass flowrate. This ratio provides an idea of how much power is required to operate the injection system and how much of the flue gas is entrained and mixed into the injection mixture jet during the time it travels to the opposite boiler wall.

When a sufficient amount of energy is provided to the injection system, the combustion effluent gas will be rapidly contacted by and mixed with the high velocity injection mixture. This, in turn, means that desirably high levels of NOx removal can be achieved.

In order to achieve adequate cross-sectional coverage of the gas duct 16 with injection nozzle assemblies 24 of this invention, and to attain the desired amount of mixing, it is preferred that the mass flowrate of injection fluid mixture introduced into the flue gas duct from each injection nozzle be greater than about 0.1% of the mass flowrate of the combustion effluent gas. In a preferred embodiment of the injection system 12 of this invention, four injection jet assemblies 24 are used, with equal quantities of the injection mixture being supplied from each nozzle, and with the total mass flowrate of injection fluid being greater than 0.4% of the mass flowrate of the combustion effluent gas. If the amount of injection fluid mixture is less than about 0.1%, the degree of mixing and cross-sectional coverage will be insufficient. If four nozzle assemblies are used, the flowrate of the injection fluid would, therefore, be more than 0.4% of the amount of flue gas flowrate.

Figure 3:
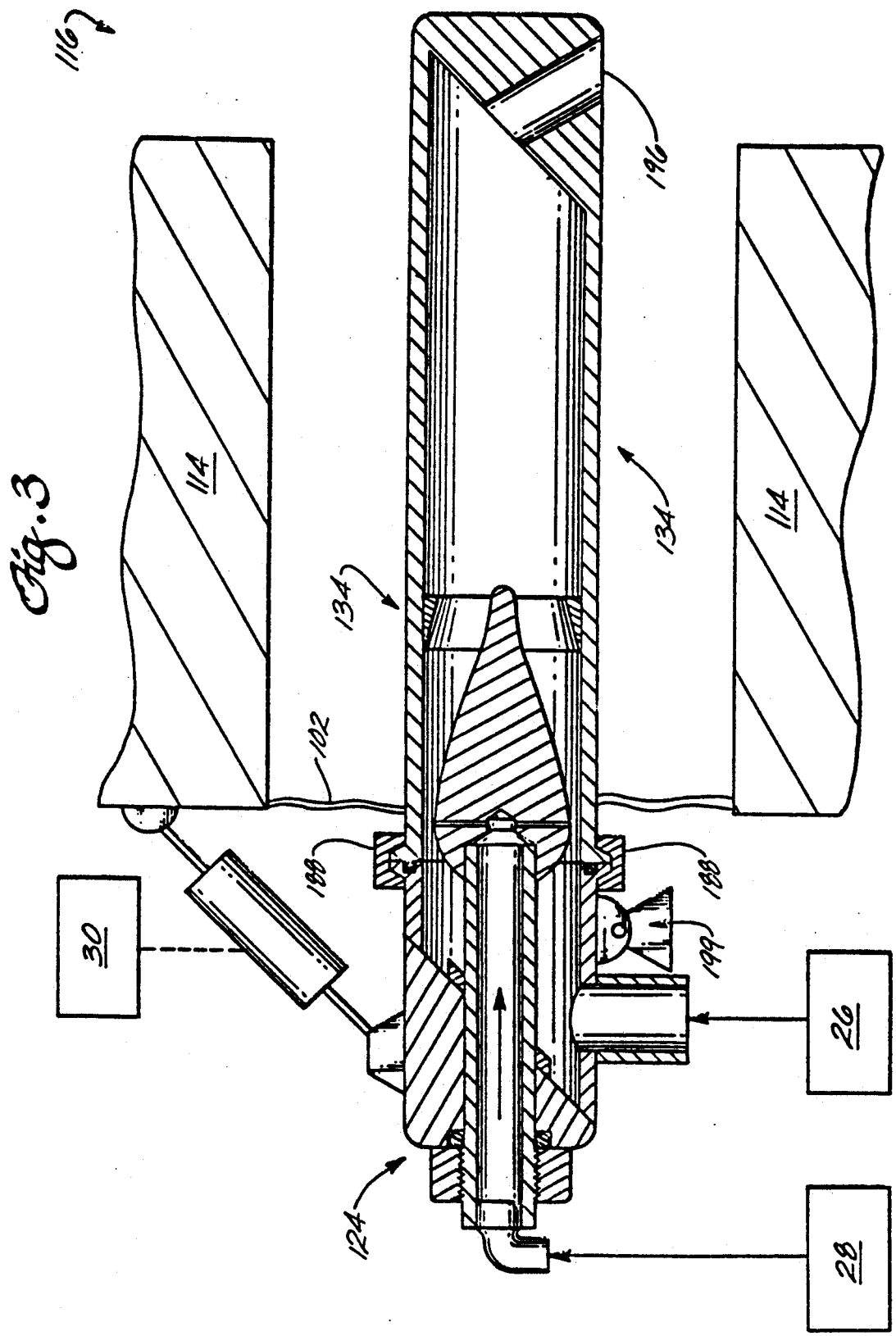
FIG. 3 is a semi-schematic side view, in partial cross-section, of another preferred embodiment of a nozzle assembly provided in accordance with practice of this invention.

Turning to FIG. 3, there is shown a schematic top view, in partial cross-section, of a second preferred embodiment of a nozzle assembly 124 provided in accordance with practice of principles of this invention extending through the wall 114 of the gas duct 116. The components of the nozzle 124 are the same as the components of the nozzle assembly 24, with the exception that the orifice 196 is not along the longitudinal axis of the nozzle assembly but, instead, is at an angle to it. Preferably, the angle between the axis of the orifice and the longitudinal axis of the nozzle assembly does not exceed about 70°. Also shown in FIG. 3 (but not shown in the other figures) is a flexible gas-tight boot 102, provided in accordance with this invention, for preventing the flow of gases through the opening in the wall 114 of the boiler from the flue gas duct 116. The connection of the boot 102 is made by suitable means between the mixing section 134 and the opening through the wall 114.

Figure 4:
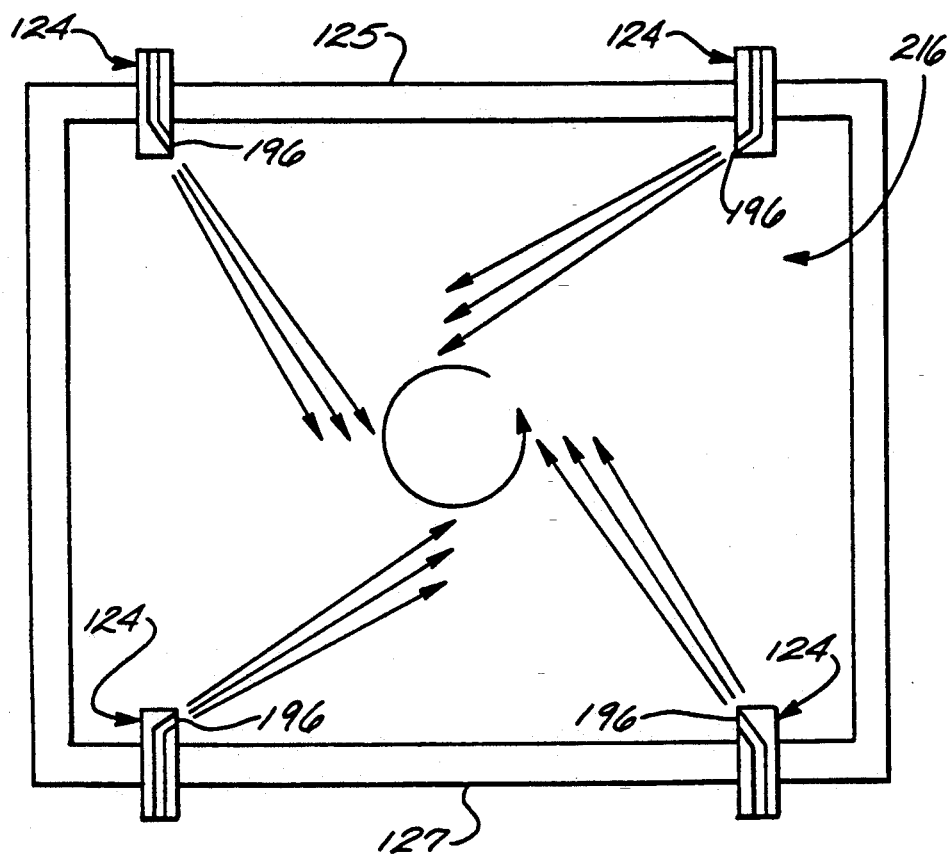
FIG. 4 is a schematic, top cross-sectional view of a flue gas duct having four nozzle assemblies provided in accordance with this invention extending through the gas duct walls in a configuration to provide a tangential gas flow pattern.

Turning to FIG. 4, there is shown a schematic top cross-sectional view of a flue gas duct 116 having two nozzle assemblies 124 extending through one of its walls 125 and two additional nozzle assemblies 124 extending through an opposing wall 127. The gas flow orifices 196 are aligned generally toward the centerline of the duct 116, so that the injection mixture entering the duct from the nozzles 124 achieves a tangentially swirling flow pattern which imparts some degree of bulk flow swirl to the flue gas flowing through the duct. Providing such a swirling pattern by means of the nozzle aiming direction is an excellent means of providing a high degree of cross-sectional coverage and mixing of the injection fluid with the flue gas in the shortest possible time, all other jet injection system parameters being equal.

One example of practice of this invention is its application to a combustion system of a municipal solid waste incineration system rated to burn about 300 tons per day of solid waste and resulting in a flue gas flowrate of about 50,000 standard cubic feet per minute (SCFM). Injection nozzles provided in accordance with this invention were installed in the incineration system boiler with air used as the carrier gas and having the calculated velocity of the injection mixture of about 1200 ft/sec. The jet momentum coefficient was about 13,000. The largest boiler dimension was about 15 feet. Jet orifices were provided in two sizes: 1.1 inches, corresponding to $X/D_o$ of about 160, and 0.7 inches, corresponding to $X/D_o$ of about 260. The injection mixture mass flowrate was about 0.75% of the flue gas flowrate per jet for the large nozzles and about 0.35% of the flue gas flowrate per jet for the smaller nozzles. The number of nozzles used for the injection system (as illustrated in the figures of my Feb. 2, 1988 patent application PCT/US88/00463) was 16, with four nozzles located at each of four levels of injection. The center body diameter was about 2.5 inches, and the mixing section inner diameter was about 3.0 inches in these nozzles. The center bodies all contained eight equally spaced bores with a bore diameter of 1/16 inch.

Referring to FIG. 5, there is shown yet another embodiment of a nozzle assembly 224 provided in accordance with practice of principles of this invention extending through a wall 214 of the gas duct 216. (The components of the nozzle assembly 224 shown in FIG. 5 are identical to the components of the assembly 24 of FIG. 1, except for the injector assembly components.) The nozzle assembly 224 is preferably used when the injection chemical is provided as a gas. In this embodiment, the injector assembly 238 comprises a cylindrical injector tube 246 having an orifice 247 in its discharge and 248 so that the injection chemical introduced into the injection tube 246 via the fitting 259 exits the orifice 247 directly into the mixing chamber 276 and, thence, out through the nozzle orifice 296 into the flue gas.

Turning again to FIG. 2, in order to optimize the performance of the injection system 12 provided in accordance with this invention, it is important that the nozzle assemblies 24 are positioned at desired locations in the flue gas duct, and that means are provided to aim the nozzles in appropriate directions to thereby maximize the degree of mixing and minimize the amount of energy needed to supply the injection system with carrier gas. Generally, the preferred location and orientation of the nozzle assemblies 24 in a flue gas duct would be predetermined prior to installation by mans of wind tunnel testing, or by other means, including mathematical flow model calculations. These procedures are generally much less expensive than carrying out field modifications to an injection nozzle system which has previously been installed.

During the start-up of an injection system 12, it is generally desirable to conduct optimization tests to finalize the best nozzle orifice size and the best aiming direction for each such injection nozzle. However, in some applications, it may be desirable to mount one or more of the injection nozzles on a pivot or swivel, so that the direction of the injection mixture jet from each such nozzle 24 can be manually or automatically aimed in the desired direction.

The temperature of the combustion effluent gas changes as a function of time according to operating conditions, fuel composition and feed rate, and other variables. The NOx removal process is very sensitive to the temperature of the combustion effluent gases, and a relatively narrow temperature window exists in order to achieve high levels of NOx removal. It is therefore desirable to be able to automatically adjust the aiming direction of the injection nozzle assemblies 24 according to the temperature of the combustion effluent gas, the effluent gas NOx concentration, or some other process parameter. Since the nozzle assemblies of this invention are capable of providing penetration across entire boiler cross-sections, the mixture of injection chemical and carrier gas can be caused to penetrate into colder or hotter zones of the boiler by adjustment of the aiming direction.

In a preferred embodiment of the nozzle system 12 of this invention, the body section 32 of the nozzle assembly 24 is mounted on a pivot or swivel 99, so that the nozzle can be moved; thus, aiming the injection mixture jet which is injected into the duct via the orifice 96.

In a preferred embodiment of the injection system 12 of this invention, the control system 30 is provided to monitor process parameters and to move the nozzle on the pivot or swivel 99 by means of a ram 97, or the like, to thereby aim the nozzle orifice in the desired direction automatically. Preferably, the nozzle can be aimed in any desired direction.

Turning to FIG. 3, a similar swivel 199 is provided on the nozzle assembly 124 to provide for its movement by the system 30, as appropriate. Furthermore, when a nozzle assembly such as the assembly 124 is used, the nozzle orifice 196 may be manually pointed in various directions by simply loosening the clamping ring 188, detaching the sealing boot 102, and twisting the mixing section 134 until the nozzle orifice 196 points in the desired direction. When the nozzle orifice is in the desired direction, the ring 188 can be retightened to hold the mixing section 134 securely in place on the body section 132 and the sealing boot 102 reinstalled.

The above description of preferred embodiments of the methods and apparatus for removing NOx from flue gas streams are for illustrative purposes. Because of variations, which will be apparent to those skilled in the art, the present invention is not intended to be limited to the particular embodiments described above. The scope of the invention is defined in the following claims.

What is claimed is:

1. An apparatus for mixing fluids together and for injecting the resulting mixture through the walls of a gas duct into a combustion effluent gas stream, the system comprising:
   (a) at least one nozzle, said nozzle comprising:
      (i) a body section extending through a gas duct wall, the body section including:
         a chamber having upstream and downstream ends, wherein the chamber is closed at its upstream end and is open at its downstream end for discharge of fluids;
         an inlet extending into the chamber for entry of a first fluid at said upstream end; and
         an injector assembly comprising an injector tube extending into the chamber for entry of a second fluid into the nozzle, the injector tube having an inlet end outside the chamber and a discharge end, wherein the injector tube discharge end is positioned downstream from the first fluid inlet;
      (ii) a mixing section comprising a chamber having an interior surface and an exterior surface, the chamber configured to extend through the gas duct wall and having an outlet orifice configured to discharge an injection mixture into the combination effluent gas stream; and
      (iii) means for removably coupling the discharge end of the body section to the inlet end of the mixing section, wherein said coupling means is outside the gas duct wall; and
   (b) means for supplying an injection fluid mixture through the mixing section so that the outlet orifice flow rate is at least 0.4% of the combustion effluent gas flow rate and said outlet orifice discharge velocity is at least 0.6 times the speed of sound in the injection mixture.

2. An apparatus as is claimed in claim 1 wherein the injector assembly additionally comprises a center body mounted on the discharge end of the injector tube, wherein at least one bore extends from the injector tube discharge through the center body to a surface of the center body, so that the second fluid flowing from the injector tube discharge will pass through the center body bore and out from the center body to thereby mix with the first fluid.

3. An apparatus as is claimed in claim 2 wherein the center body has a teardrop shape, rounded on one end and tapering to its opposite end, the center body rounded end being mounted on the discharge end of the injector tube with the longitudinal axis of the center body extending essentially along the longitudinal axis of the nozzle.

4. An apparatus as is claimed in claim 3 wherein at least four bores extend from the injector tube discharge approximately to the maximum diameter of the center body, the bores being in a plane substantially perpendicular to the longitudinal axis of the center body and spaced apart equally from each other around the center body.

5. An apparatus as is claimed in claim 3 wherein the mixing section chamber has a cylindrical shape, and the tapered end of the center body extends into the mixing section when the discharge end of the body section is coupled to the inlet end of the mixing section.

6. An apparatus as is claimed in claim 1 wherein the means for removably coupling the discharge end of the body section to the inlet end of the mixing section comprises a flange around the discharge end of the body section, a flange around the inlet end of the mixing section, and a coupling ring configured to hold the flanges together in a gas sealing arrangement.

7. An apparatus as is claimed in claim 1 wherein at least one liquid dispersion ring is located on the interior surface of the mixing section chamber, the dispersion ring having a first diameter at its upstream end and tapering to a second smaller diameter at its downstream end.

8. An apparatus as is claimed in claim 7 wherein the dispersion ring second diameter is not less than about 80% of the dispersion ring first diameter.

9. An apparatus as is claimed in claim 1 wherein the outlet orifice is of a dimension sufficient to provide that the discharge velocity is at about the speed of sound in the injection mixture.

10. An apparatus as is claimed in claim 1 wherein the outlet orifice diameter is of a size so that the ratio of the largest dimension of the gas duct at the location of the nozzle to the outlet orifice diameter is at least 50 to 1.

11. An apparatus as is claimed in claim 1 wherein an orifice having a coverging-diverging cross-section extends through the outlet end of the mixing section.

12. An apparatus for mixing fluids together and for injecting the resulting mixture through the walls of a gas duct into a combustion effluent gas stream, the system comprising:
  (a) at least one nozzle comprising:
    (i) a body section extending through a gas duct wall,;
    (ii) a mixing section comprising a straight cylindrical chamber configured to extend through the gas duct wall and having an outlet portion extending into the gas stream and an inlet end extending outside the gas duct wall and joined to the body section;
    (iii) a jet nozzle orifice in the outlet portion of the mixing section; and
    (iv) means for removably coupling the body section to the inlet end of the mixing section, wherein said coupling means is outside the gas duct wall; and
  (b) means for supplying an injection fluid mixture through the mixing section so that said jet nozzle flow rate is greater than 0.4% of the flow rate of the combustion effluent stream and said jet nozzle discharge velocity is at least 0.6 times the speed of sound in the injection mixture.

13. An apparatus as is claimed in claim 12 additionally comprising means for aiming such a nozzle in a desired direction.

14. An apparatus as is claimed in claim 12 wherein at least four nozzles are provided, the nozzles being spaced apart from each other around the periphery of the duct and being at about the same location relative to their position along the gas flow path, the system additionally comprising means for aiming each such nozzle in a desired direction.

15. An apparatus as is claimed in claim 14 wherein four nozzles are provided, located approximately at the four corners of a generally rectangular gas duct, wherein each of the four nozzles is aimed generally toward of the center of the duct to impart a tangential swirl to the combustion effluent gas flowing in the gas duct.

16. An apparatus as is claimed in claim 13 wherein the aiming means comprises a swivel assembly, and flexible connection means are provided between the first fluid-introducing means and the body section chamber.

17. An apparatus as is claimed in claim 16 wherein the aiming means includes means for automatic aiming of such a nozzle in response to one or more selected inputs.

18. An apparatus as is claimed in claim 17 wherein the aiming means is responsive to temperature in the combustion effluent gas inside the gas duct.

19. An apparatus as is claimed in claim 13 wherein the aiming means includes a nozzle orifice which is aimed at an angle of 70° or less from the longitudinal axis of the nozzle mixing section.

20. An apparatus as is claimed in claim 19 wherein means are provided for rotating the mixing section on the body section to thereby change the aim of the nozzle orifice.

21. An apparatus as is claimed in claim 1, wherein said means for supplying the injection fluid mixture additionally provides that the momentum coefficient of the injection mixture as it is discharged from the outlet orifice is greater than 1000.

22. An apparatus as is claimed in claim 12, wherein said means for supplying the injection fluid mixture additionally provides that the momentum coefficient of the injection mixture as it is discharged from the outlet orifice is greater than 1000.

23. An apparatus as is claimed in claim 12, wherein a liquid dispersion ring is located on the interior surface of the mixing section chamber, the dispersion ring having a first diameter at its upstream end and tapering to a second smaller diameter at its downstream end, wherein the dispersion ring second diameter is between 80% and 90% of the dispersion ring first diameter.

24. An apparatus as is claimed in claim 12 wherein the nozzle orifice on the outlet portion of the mixing section has a diameter which is less than 2% of the width of the gas duct at the location of the nozzle.

* * * * *